United States Patent
Backfolk et al.

(10) Patent No.: US 11,326,306 B2
(45) Date of Patent: May 10, 2022

(54) METHOD TO PRODUCE A FIBROUS PRODUCT COMPRISING MICROFIBRILLATED CELLULOSE

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Katja Lyytikäinen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/955,470

(22) PCT Filed: Dec. 17, 2018

(86) PCT No.: PCT/IB2018/060159
§ 371 (c)(1),
(2) Date: Jun. 18, 2020

(87) PCT Pub. No.: WO2019/123191
PCT Pub. Date: Jun. 27, 2019

(65) Prior Publication Data
US 2021/0095424 A1    Apr. 1, 2021

(30) Foreign Application Priority Data

Dec. 19, 2017   (SE) .................... 1751572-7

(51) Int. Cl.
| | | |
|---|---|---|
| D21H 11/18 | (2006.01) | |
| B32B 27/10 | (2006.01) | |
| B32B 27/32 | (2006.01) | |
| D21F 1/00 | (2006.01) | |
| D21H 17/32 | (2006.01) | |
| D21H 17/42 | (2006.01) | |
| D21H 17/45 | (2006.01) | |
| D21H 21/08 | (2006.01) | |
| D21H 23/04 | (2006.01) | |

(52) U.S. Cl.
CPC ............ D21H 11/18 (2013.01); B32B 27/10 (2013.01); B32B 27/32 (2013.01); D21F 1/0027 (2013.01); D21H 17/32 (2013.01); D21H 17/42 (2013.01); D21H 17/45 (2013.01); D21H 21/08 (2013.01); D21H 23/04 (2013.01); B32B 2307/72 (2013.01)

(58) Field of Classification Search
USPC ......................................................... 162/103
See application file for complete search history.

(56) References Cited

U.S. PATENT DOCUMENTS

| | | |
|---|---|---|
| 5,858,174 A | 1/1999 | Persson et al. |
| 9,896,580 B2 | 2/2018 | Gantenbein et al. |
| 2008/0108714 A1 | 5/2008 | Swazey et al. |
| 2010/0084103 A1 | 4/2010 | Reinicke |
| 2011/0081554 A1 | 4/2011 | Ankersfors et al. |
| 2012/0298319 A1 | 11/2012 | Fujiwara et al. |
| 2013/0180680 A1 | 7/2013 | Axrup et al. |
| 2014/0102649 A1 | 4/2014 | Esser |

FOREIGN PATENT DOCUMENTS

| | | |
|---|---|---|
| CN | 1145967 A | 3/1997 |
| CN | 104284945 A | 1/2015 |
| CN | 104532673 A | 4/2015 |
| CN | 101952512 A | 1/2019 |
| JP | 1095803 H | 4/1998 |
| WO | 2012039668 A1 | 3/2012 |
| WO | 2012107642 A1 | 8/2012 |
| WO | 2013060934 A2 | 5/2013 |
| WO | 2017046754 A1 | 3/2017 |

OTHER PUBLICATIONS

European Search Opinion from corresponding European application No. 18 891 347.9.
Supplementary European Search Report from corresponding European application No. 18 891 347.9 completed Jul. 14, 2021.
Myllytie, Petri et al., Effect of polymers on aggregation of cellulose fibrils and its implication on strength development in wet paper web, Nordic Pulp and Paper Research Journal, vol. 24, No. 2, 2009, 125-134.

*Primary Examiner* — Mark Halpern
(74) *Attorney, Agent, or Firm* — Greer, Burns & Crain, Ltd.

(57) ABSTRACT

A method for the production of a fibrous product from a fibrous web, wherein the method comprises the steps of: —providing a fibrous suspension comprising a microfibrillated cellulose, wherein the content of the microfibrillated cellulose of said suspension is in the range of 60 to 99.9 weight-% based on total dry solid content, —adding an uncharged, amphoteric or weakly cationic polymer having a molecular weight of at least 50000 g/mol to said suspension, —adding an anionic polymer having a molecular weight of at least 00000 g/mol to said suspension to provide a mixture of said microfibrillated cellulose, said uncharged, amphoteric or weakly cationic polymer and said anionic polymer, 1—providing said mixture to a substrate to form a fibrous web, wherein the amount of uncharged, amphoteric or weakly cationic polymer in said mixture is in the range of 0.1 to 20 kg/metric ton based on total dry solid content and wherein the amount of anionic polymer in said mixture is in the range of 0.01 to 10 kg/metric ton based on total dry 20 solid content; and—dewatering said fibrous web to form a fibrous product.

10 Claims, No Drawings

METHOD TO PRODUCE A FIBROUS PRODUCT COMPRISING MICROFIBRILLATED CELLULOSE

This application is a U.S. National Phase under 35 U.S.C. § 371 of International Application No. PCT/IB2018/060159, filed Dec. 17, 2018, which claims priority under 35 U.S.C. §§ 119 and 365 to Swedish Application No. 1751572-7, filed Dec. 19, 2017.

TECHNICAL FIELD

The present invention relates to an improved method for preventing the formation of fiber agglomerates in a suspension comprising microfibrillated cellulose and to an improved method of producing a fibrous product from a fibrous web.

BACKGROUND

The manufacturing of a fibrous product or film from a suspension comprising microfibrillated cellulose (MFC) on a paper machine is very demanding. Due to a low dewatering speed and formation of a dense fibrous product, there are problems when releasing the material from the wire of the paper machine. There is also a risk that a too strong dewatering may cause pin-holes in the web, which deteriorates the quality of the product. Another critical variable is the formation of the web, which in turn affects the web properties.

Various manufacturing methods have been proposed to make MFC or NFC (nanofibrillated cellulose) films such as free standing films by coating NFC on plastic support material like PE or PET (WO13060934A2).

JP10095803A discloses a method wherein bacterial nanocellulose (BNC) is sprayed on paper which acts as a base substrate. Similar methods, i.e. to use paper or paperboard substrate have been studied and reported quite frequently in the prior art.

US2012298319A teaches a method of manufacturing MFC film by applying furnish directly on a porous substrate thus allowing the MFC to be dewatered and filtered.

WO12107642A1 addresses the problem with the hygroscopic properties of MFC, which was solved by using organic solvent when preparing the films.

WO2017046754A1 is directed to the addition of an amphoteric polymer to a suspension of microfibrillated cellulose.

US20140102649A1 is directed to a process for the production of paper, board and cardboard having high dry strength by addition of an aqueous composition comprising a nanocellulose and at least one polymer selected from the group consisting of anionic polymers and water-soluble cationic polymers, draining of the paper stock and drying of the paper products.

Highly fibrillated cellulose, such as unmodified fibrillated cellulose or nanocellulose, has a tendency to self-aggregate or agglomerate and form larger bundles when present in a suspension. The bundles are typically aggregated or agglomerated fibrils and may also contain for examples fines. The bundles are large enough to be observed by optical microscopy and, in the case of larger bundles, even without microscopy. The bundles can be a problem in terms of product quality and stability which affects e.g. water holding capacity, film forming (barrier) properties, optical properties, strength and reinforcement performance as well as runnability behavior during substrate manufacturing. The problem of fibers or fibrils being agglomerated after having been suspended is particularly common when the suspension also contains relatively long fibers and/or fines. Thus, the self-aggregation or agglomeration as referred to herein arises when a suspension of microfibrillated cellulose is subjected to storage or is being stirred. The self-aggregation or agglomeration typically starts shortly after the fibrillated material has been produced and increases over time and upon stirring of the suspension. The formation of agglomerates is particularly troublesome when manufacturing thin products, such as films, thin paper, thin paper filters etc.

In attempts to solve this problem, the use of various additives for MFC have been proposed in the prior art but these are mostly used to improve retention or strength effects, or then to facilitate re-dispersion of MFC.

It would be assumed that the formation of flocks and bundles could be reduced by intensive mixing of the material in a suspension, but unfortunately the opposite effect has been observed, i.e. bundles are in fact formed during mixing, at least at certain shear rates. The use of high-shear mechanical disintegration, which may break the flocks and bundles formed, generally requires additional investments and solves the problem only temporarily.

There is thus a need for an improved method for handling MFC in suspensions and to prepare a suspension with improved storage stability, wherein the formation of fiber agglomerates in nanocellulose suspensions can be reduced and wherein dewatering, retention and network structure properties can be controlled and improved when preparing a product comprising microfibrillated cellulose.

SUMMARY

It is an object of the present disclosure to provide an improved method of manufacturing a fibrous product comprising microfibrillated cellulose, which eliminates or alleviates at least some of the disadvantages of the prior art methods. It is also an object of the present invention to provide a method to prevent or reduce the aggregation of fibers or fibrils in a suspension.

The invention is defined by the appended independent claims. Embodiments are set forth in the appended dependent claims and in the following description.

It has surprisingly been found that by using a two component chemical dosing method, it is possible to significantly reduce and prevent fibril bundle formation in a suspension of MFC. It has been found that, compared to the prior art, the addition of an anionic polymer to the suspension of MFC means that the formation of fiber or fibril agglomerates can be reduced, in combination with the addition of a relatively low amount of uncharged, amphoteric or weakly cationic polymer to the suspension.

According to a first aspect, there is provided a method for the production of a fibrous product from a fibrous web, wherein the method comprises the steps of:
  providing a fibrous suspension comprising a microfibrillated cellulose, wherein the content of the microfibrillated cellulose of said suspension is in the range of 60 to 99.9 weight-% based on total dry solid content,
  adding an uncharged, amphoteric or weakly cationic polymer having a molecular weight of at least 50000 g/mol to said suspension,
  adding an anionic polymer having a molecular weight of at least 100000 g/mol to said suspension to provide a mixture of said microfibrillated cellulose, said uncharged, amphoteric or weakly cationic polymer and said anionic polymer, providing said mixture to a substrate to form a fibrous web, wherein the amount of uncharged, amphoteric or weakly cationic polymer in said mixture is in the range of 0.1 to 20 kg/metric ton based on total dry solid content and wherein the amount of anionic polymer in said mixture is in the range of 0.01 to 10 kg/metric ton based on total dry solid content; and dewatering said fibrous web to form a fibrous product.

By amphoteric is meant that the polymer contains both cationic and anionic (chargeable) groups. The level of charge is determined by degree of substitution, pH and, for example, electrolyte type and concentrations. By weakly cationic is meant that the polymer contains cationic groups, but has a charge density of less than 1 mEq/g at pH 4.5, preferably less than 0.7 mEq/g or less than 0.5 mEq/g.

By providing a mixture of the microfibrillated cellulose, the uncharged, amphoteric or weakly cationic polymer as well as the anionic polymer, there is provided a way of reducing the amount of agglomeration of the microfibrillated cellulose in the suspension. This facilitates the manufacturing of a fibrous product, without the disadvantages normally associated with this type of process.

According to one embodiment the production of the fibrous product is done in a paper making machine where the substrate is a porous wire on which the fibrous web is formed. According to one embodiment the production speed of said paper making machine may be in the range of 20 to 1200 m/min.

The fibrous product may for example be a film. The film may have a basis weight of less than 40 g/m$^2$ and a density in the range of from 700 to 1600 kg/m$^3$.

Through the method according to the present invention it is thus possible to form a wet web and/or film on the wire and pick the formed film from the wire at a high production speed, which has previously been considered to be very difficult. At a high production speed it is important to have a fast dewatering, which can be facilitated by vacuum suction, where the films comprising the microfibrillated cellulose may be treated by vacuum under/backside of the wire.

According to one embodiment of the first aspect the fibrous web is preferably formed by adding the mixture, preferably by casting the suspension, onto the substrate. The substrate may be a paper or paperboard substrate thus forming a paperboard or paper substrate coated with a film of microfibrillated cellulose. The substrate may also be a polymer or metal substrate. The casted fibrous web can then be dried in any conventional manner and thereafter peeled off from the substrate. The peeled off fibrous web is thereafter conducted to a drying equipment to create a dried fibrous product.

According to one embodiment of the first aspect the uncharged, amphoteric or weakly cationic polymer is an amphoteric polymer. Preferably, the amphoteric polymer is selected form the group comprising amphoteric polysaccharides and amphoteric hydrocolloids. The amphoteric polymer may be gum-like natural polymers, amphoteric starch, amphoteric cellulose derivative, amphoteric protein, amphoteric hemicellulose or amphoteric modified xylan or mixtures thereof. Preferably, the polymer has a molecular weight of at least 50000 g/mol, such as at least 100000 g/mol. Preferably, the uncharged, amphoteric or weakly cationic polymer interacts with the microfibrillated cellulose in the suspension, such as by electrostatic interaction, hydrogen bonding, van der Waals forces or is driven by release of water molecules from the highly hydrated cellulose surfaces.

The amphoteric polysaccharide or amphoteric hydrocolloid may be amphoteric guar gum. The guar gum may also be uncharged, such as native guar gum. Guar gum is mainly consisting of the high molecular weight polysaccharides composed of galactomannans which are consisting of a linear chain of (1→4)-linked β-D-mannopyranosyl units with (1→6)-linked α-D-galactopyranosyl residues as side chains. The mannose:galactose ratio is approximately 2:1.

The amphoteric polymer, such as a polysaccharide or hydrocolloid polymer may thus be a bio-based polymer. It has also been found that the addition of amphoteric guar gum to the suspension of microfibrillated cellulose reduces the adhesion to the papermaking wire and also improves the barrier properties of a film manufactured according to the present invention.

According to one embodiment the amount of amphoteric guar gum in the web is in the range of 0.1 to 20 kg/metric ton based on total dry solid content. Preferably, the amount of amphoteric guar gum in the web is in the range of 0.1 to 5 kg/metric ton based on total dry solid content, such as in the range of from 0.4 to 2 kg/metric ton or 0.4 to 1 kg/metric ton based on total dry solid content.

According to another embodiment the amphoteric polymer may be an amphoteric protein.

According to yet an embodiment the amphoteric polymer may be an amphoteric starch.

According to one embodiment of the first aspect the anionic polymer is selected from the group comprising anionic superfine MFC, anionic carboxymethylcellulose, synthetic polymers such as anionic polyacrylamide or anionic guar gums or mixtures thereof. Preferably, the anionic polymer has a molecular weight of at least 100000 g/mol, such as at least 200000 g/mol. The anionic polymer may be anionic polyacrylamide (A-PAM).

According to one embodiment, the amount of anionic polymer in the web comprising the microfibrillated cellulose, the uncharged, amphoteric or weakly cationic polymer and the anionic polymer, is in the range of 0.01 to 10 kg/metric ton based on total dry solid content. Preferably, the amount of amphoteric guar gum in the web comprising the microfibrillated cellulose and the guar gum, is in the range of 0.02 to 5 kg/metric ton based on total dry solid content, such as in the range of from 0.1 to 2 kg/metric ton or 0.1 to 1 kg/metric ton based on total dry solid content. Preferably, the anionic polymer has limited interaction with the microfibrillated cellulose in the suspension.

The polymers can be provided separately or mixed into a solution or suspension which is added to the suspension comprising MFC. The polymer solution or suspension may be concentrated and have a dry content of about 70% or 60% or 50% or 40% or 30% or 20%. Alternatively, the polymers may be added to MFC suspension one at a time. Alternatively, some or all of the polymers may be brought into contact with the MFC before or at the time of preparing the MFC suspension.

According to one embodiment of the first aspect the microfibrillated cellulose has a Schopper Riegler value (SR°) of more than 90 SR°, or more than 93 SR°, or more than 95 SR°. The surface area of the fibrous product is typically about 1 to 200 m$^2$/g, such as 50 to 200 m$^2$/g when determined for a freeze-dried material with the BET method.

According to a second aspect there is provided a film comprising microfibrillated cellulose and uncharged, amphoteric or weakly cationic polymer as well as anionic polymer, obtained by the method according to the first aspect, wherein said film has a basis weight of less than 40 g/m$^2$ and a density in the range of 700 to 1600 kg/m$^3$.

According to a third aspect there is provided a laminate comprising a film according to the second aspect and a thermoplastic polymer, such as any one of a polyethylene, a polyethylene terephthalate and a polylactic acid.

This laminate structure may provide for even more superior barrier properties.

According to one embodiment of the third aspect the polyethylene may be any one of a high density polyethylene and a low density polyethylene.

According to a fourth aspect there is provided the film according to the second aspect or the laminate according to the third aspect, wherein said film or said laminate is applied to the surface of any one of a paper product and a board.

A fifth aspect of the invention is a method to reduce agglomeration of fibers or fibrils in an aqueous suspension comprising microfibrillated cellulose, wherein the suspension contains 0.3-5 weight-% solids, comprising the steps of:
- providing a fibrous suspension comprising a microfibrillated cellulose, wherein the content of the microfibrillated cellulose of said suspension is in the range of 60 to 99.9 weight-% based on total dry solid content,
- adding an uncharged, amphoteric or weakly cationic polymer having a molecular weight of at least 50000 g/mol to said suspension,
- adding an anionic polymer having a molecular weight of at least 100000 g/mol to said suspension to provide a mixture of said microfibrillated cellulose, said uncharged, amphoteric polymer or weakly cationic polymer and said anionic polymer.

The suspension according to this fifth aspect can be stored, transported and optionally dewatered or dried. The suspension can be used in the manufacture of paper, films, board, coating, barrier coating, nonwoven product, strings, yarn, composites and other products in which it is desirable to include microfibrillated cellulose. In the manufacture of paper, the suspension according to the fifth aspect of the invention is typically added to the wet end of a conventional process for papermaking. The proportion or amount of suspension added to the wet end depends on the desirable characteristics of the paper product to be produced.

DETAILED DESCRIPTION

According to the inventive method a fibrous product such as a film is formed, by providing a fibrous suspension onto a substrate and dewatering the web to form said fibrous product such as film.

According to one embodiment a suspension comprising a microfibrillated cellulose is provided to form said fibrous product.

The fibrous content of the fibrous suspension may, according to one embodiment be in the range of from 60 to 99.9 weight-% based on total dry solid content. According to an alternative embodiment the fibrous content may be in the range of 70 to 95 weight-% based on total dry solid content, or in the range of from 75 to 90 weight-% based on total dry solid content.

According to one embodiment the fibrous content is exclusively formed by the microfibrillated cellulose.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 weight-%) when dispersed in water. The cellulose fiber is preferably fibrillated to such an extent that the final specific surface area of the formed MFC is from about 1 to about 200 $m^2/g$, or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper. Preferably, the MFC is made from softwood fibers.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

According to one embodiment the MFC may have a Schopper Riegler value (SR°) of more than 90. According to another embodiment the MFC may have a Schopper Riegler value (SR°) of more than 93. According to yet another embodiment the MFC may have a Schopper Riegler value (SR°) of more than 95. The Schopper-Riegler value can be obtained through the standard method defined in EN ISO 5267-1. This high SR value is determined for a re-pulped wet web, with or without additional chemicals, thus the fibers have not consolidated into a film or started e.g. hornification.

The dry solid content of this kind of web, before disintegrated and measuring SR, is less than 50% (w/w). To determine the Schopper Riegler value it is preferable to take a sample just after the wire section where the wet web consistency is relatively low. The skilled person understands that paper making chemicals, such as retention agents or dewatering agents, have an impact on the SR value.

The SR value specified herein, is to be understood as an indication but not a limitation, to reflect the characteristics of the MFC material itself. However, the sampling point of MFC might also influence the measured SR value. For example, the furnish could be either a fractionated or an unfractionated suspension and these might have different SR values. Therefore, the specified SR values given herein, are thus either a mixture of coarse and fine fractions, or a single fraction comprising an MFC grade providing the desired SR value.

According to another embodiment the fibrous content is formed by a mixture of different types of fibers, such as microfibrillated cellulose, and a smaller amount of other types of fiber, such as short fibers, fine fibers, long fibers etc. By smaller amount is meant around 10% of the total fibrous content in the suspension, i.e. the main part of the fibrous content is a microfibrillated cellulose.

The MFC used in the context of the present invention is preferably non-chemically modified MFC, such as native MFC or hydrophobized MFC. However, the MFC used in the context of the present invention may also be a mixture of non-chemically modified and chemically modified MFC.

Preferably, the MFC has a high aspect ratio, i.e. length/diameter in the range of at least 100:1, preferably at least 500:1 or more preferably at least 1000:1. Preferably, the MFC is never-dried MFC or MFC that has been subjected to drying or MFC that has been concentrated to a dryness of at least 20%.

The fibrous suspension may also comprise other additives, such as fillers, pigments, retention chemicals, cross-linkers, optical dyes, fluorescent whitening agents, de-foaming chemicals, salts, pH adjustment chemicals, surfactants, biocides, optical chemicals, pigments, nanopigments (spacers) etc.

According to another embodiment the amphoteric polymer may be any one of an amphoteric hydrocolloid, such as scleroglucan, alginate, carrageenans, pectins, xanthan, hemicelluloses and amphoteric glucomannan, such as galactoglucomannan or a combination of such polymers. The hydrocolloid grade may be of both technical and high purity.

The amphoteric properties can be either naturally derived or achieved by chemical modification by adsorbing e.g. multivalent metal salts or polyelectrolytes.

According to an alternative embodiment the amphoteric polymer may be a starch.

The mixture of the microfibrillated cellulose, the uncharged, amphoteric or weakly cationic polymer and the anionic polymer is then provided onto a substrate to form a wet web.

The substrate may be a porous wire of a paper making machine.

The paper making machine may be any conventional type of machine known to the skilled person used for the production of paper, paperboard, tissue or similar products.

According to one embodiment the production speed of the paper making machine may be in the range of 30 to 1200 m/min.

The substrate may be a paper or paperboard substrate onto which the web is formed. The substrate may also be a polymer or metal substrate.

Subsequent to the wet web being placed onto the substrate, it is dewatered to form a fibrous product.

The dewatering may, according to one embodiment be performed by vacuum, hot air, hot calenders etc.

According to one embodiment the wet web is dewatered by vacuum, i.e. water, and other liquids, is sucked from the web when it is placed on the substrate.

According to one embodiment the basis weight of the fibrous product such as a film is in the range of from 10 to 40 $g/m^2$. According to an alternative embodiment the basis weight of the fibrous product such as a film is in the range of from 12 to 35 $g/m^2$ According to one embodiment the density of the fibrous product such as film is in the range of from 700 to 1600 $g/m^3$. According to one alternative embodiment the density of the fibrous product such as film is in the range of from 700 to 1400 $g/m^3$. According to yet one alternative embodiment the density of the fibrous product such as film is in the range of from 700 to 1200 $g/m^3$. According to one embodiment the density of the fibrous product such as film is in the range of from 800 to 920 $g/m^3$.

The density of the fibrous product such as film may vary depending on several factors; one of them is the filler content. If the filler content is in the range of 10-20% the density of the fibrous product such as film may be in the upper part of the range, i.e. around 1400-1600 $kg/m^3$.

According to one embodiment, for a fibrous product such as film having a grammage of 30 gsm and at a relative humidity of 50%, the fibrous product such as film may have an oxygen transmission rate (OTR) below 30 $cc/m^2/24$ h, or below 10 $cc/m^2/24$ h, or below 5 $cc/m^2/24$ h measured according to the standard ASTM D-3985.

According to one embodiment the fibrous product such as film comprising the microfibrillated cellulose may be laminated to or with a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

The film or the laminate may also be applied to other paper products, such as food containers, paper sheets, paper boards or boards or other structures that need to be protected by a barrier film.

Examples

The effect of mixing fiber suspensions in a Diaf-mixer on fibril aggregation was studied in the presence of various additives. Prior to mixing, the suspensions were diluted to 1.5 wt-% consistency using RO (reverse osmosis) water. The initial dispersing was typically done by dispersing a set amount of fiber suspension in a dilute solution of chemical additive using a rod mixer for 30 seconds (=standard mode of addition). In a reverse addition mode, the dilute solution of chemical additive was applied into the fibril suspension. In standard dual additive systems, the first chemical was applied using the standard mode of addition, i.e. fibrils introduced into the additive solution, and the second additive was dosed into the formed mixture. In the reversed dual mode, both chemical solutions were introduced into the fibril suspension. In premixing mode, the chemical additives were mixed together prior introducing the fibrils into the formed solution using the standard mode of addition. The contact time between additives and fibrils was kept short.

The obtained suspensions were then mixed in a Diaf-mixer for 10 minutes. Samples were taken after 0 min (=mixed with rod mixer), and after mixing the suspension in a Diaf-mixer for 2 min and 10 min. The samples were diluted to 0.01% consistency and visually evaluated to evaluate the effect of different additives to aggregate formation during mixing.

The visual evaluation was done in following basis:

0=heavy aggregation observed as a result of mixing
1=amount of aggregates was clearly increased in mixing, possibly some yarn formed in the blade
2=some loose clusters in blade, amount of aggregates was not significantly increased in mixing
3=loose clusters in blade, amount of aggregates was reduced to some extent as a result of mixing
4=clear dispersing effect, formation of aggregates clearly reduced

| Sample | Mode of chemical addition | Additive 1, wt % of o.d. fiber | Additive 2, wt % of o.d. fiber | Evaluation |
|---|---|---|---|---|
| Reference | — | — | — | 1 |
| Native guar gum (GG) | Standard | 0.1 | — | 2.5 |
| High Mw A-PAM (H-APAM) | Standard | 0.05 | | 3 |
| Low Mw A-PAM (L-APAM) | Standard | 0.05 | | 1.5 |
| C-PAM | Standard | 0.05 | | 1 |
| Low-foam nonionic surfactant | Standard | 0.05 | | 1 |
| GG + H-APAM | Standard dual | GG 0.1 | H-APam 0.05 | 4 |
| H-APAM + GG | Standard dual | H-APam 0.05 | GG 0.1 | 4− |
| GG + L-APAM | Standard dual | GG 0.1 | L-APam 0.05 | 3+ |
| L-APAM + GG | Standard dual | L-APam 0.05 | GG 0.1 | 3+ |
| L-APAM + GG | Premixing | L-APam 0.05 | GG 0.1 | 1.5 |
| GG + C-PAM | Standard dual | GG 0.1 | C-PAM 0.05 | 3.5 |
| GG + L-APAM | Reversed dual | GG 0.1 | L-APam 0.05 | 3+ |

APAM = anionic polyacrylamide
C-PAM = cationic polyacrylamide
GG = guar gum

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of a fibrous product from a fibrous suspension, wherein the method comprises the steps of:
    providing a fibrous suspension comprising a microfibrillated cellulose, wherein a content of the microfibrillated cellulose of said suspension is in a range of 60 to 99.9 weight-% based on total dry solid content,
    adding an uncharged, amphoteric or weakly cationic polymer having a molecular weight of at least 50,000 g/mol to said suspension,
    adding an anionic polymer having a molecular weight of at least 100,000 g/mol to said suspension to provide a mixture of said microfibrillated cellulose, said uncharged, amphoteric or weakly cationic polymer and said anionic polymer,
    providing said mixture to a substrate to form a fibrous web, wherein an amount of uncharged, amphoteric or weakly cationic polymer in said mixture is in a range of 0.1 to 20 kg/metric ton based on a total dry solid content and wherein an amount of anionic polymer in said mixture is in the range of 0.01 to 10 kg/metric ton based on the total dry solid content; and
    dewatering said fibrous web to form a fibrous product, wherein the fibrous product is a film.

2. The method as claimed in claim 1, wherein the production of the fibrous product is done in a paper making machine and wherein the substrate is a porous wire on which the mixture forms a fibrous web.

3. The method as claimed in claim 2, wherein a production speed of said paper making machine is in a range of 20 to 1200 m/min.

4. The method as claimed in claim 1 wherein the substrate is a paper, a paperboard, a polymer, or a metal substrate.

5. The method as claimed in claim 1, wherein the film has a basis weight of less than 40 g/m$^2$ and a density in a range of from 700 to 1000 kg/m$^3$.

6. The method as claimed in claim 1, wherein the uncharged, amphoteric or weakly cationic polymer is amphoteric guar gum.

7. The method as claimed in claim 6, wherein the uncharged, amphoteric or weakly cationic polymer is guar gum and a content of said guar gum in the web is in a range of 0.1 to 20 kg/metric ton based on a total dry solid content.

8. The method as claimed in claim 1, wherein the uncharged, amphoteric or weakly cationic polymer is uncharged guar gum.

9. The method as claimed in claim 1, wherein the anionic polymer is selected from the group consisting of: superfine MFC, anionic carboxymethylcellulose, synthetic polymers, or anionic guar gum.

10. The method as claimed in claim 9, wherein the anionic polymer is anionic polyacrylamide.

\* \* \* \* \*